United States Patent [19]

Weisner

[11] 4,138,802
[45] Feb. 13, 1979

[54] METHOD OF GROWING PLANTS IN THE ROOTS OF A LIVE OSMUNDA FERN

[76] Inventor: Hassel L. Weisner, 118 W. Primrose, P.O. Box 765, La Feria, Tex. 78559

[21] Appl. No.: 853,742

[22] Filed: Nov. 21, 1977

[51] Int. Cl.² ............................................. A01G 1/00
[52] U.S. Cl. ........................................ 47/58; 47/66; 47/6
[58] Field of Search ................................ 47/58, 5–7, 47/DIG. 3, 5.5, 66

[56] References Cited

U.S. PATENT DOCUMENTS

| 107,427 | 9/1870 | Wagener | 47/6 |
| 3,110,128 | 11/1963 | Collins | 47/5.5 |

OTHER PUBLICATIONS

Practical Grafting Methods, Science & Invention, Aug. 1927, p. 307.
New Illustrated Encyclopedia of Gardening, 1960, Everett, Greystone Press, N.Y., pp. 782–783.
New York Sunday News, Nov. 20, 1960, p. 104.
Jones & Scully 1974–1975 catalog, Miami, FLA, p. 146.

Primary Examiner—Robert E. Bagwill

[57] ABSTRACT

A planter is comprised of a living plant, such as an osmunda fern and the like, having a large porous and fibrous root, and at least one hole formed in the root of the living plant for receiving the roots of a diverse live plant, the fibrous root of the living plant being capable of absorbing and retaining water and nutrients for sustaining the life of the diverse live plant. The fibrous root of the living plant is preferably potted within a container which encompasses the root leaving an intermediate space between the container walls and the root which is filled with peat, or other humus.

The method for growing plants comprises: incising at least one hole in the root of a living plant having a large porous and fibrous root which is capable of absorbing and holding water and plant nutrients, wrapping the roots of a diverse live plant with sphagnum moss, inserting the wrapped root of the diverse live plant in the incised hole, and periodically pouring water onto the porous and fibrous root of the living plant so that the water is absorbed and held by the porous and fibrous root. Nutrients for the diverse plant may be mixed with the water poured over the fibrous root.

7 Claims, 1 Drawing Figure

U.S. Patent    Feb. 13, 1979    4,138,802
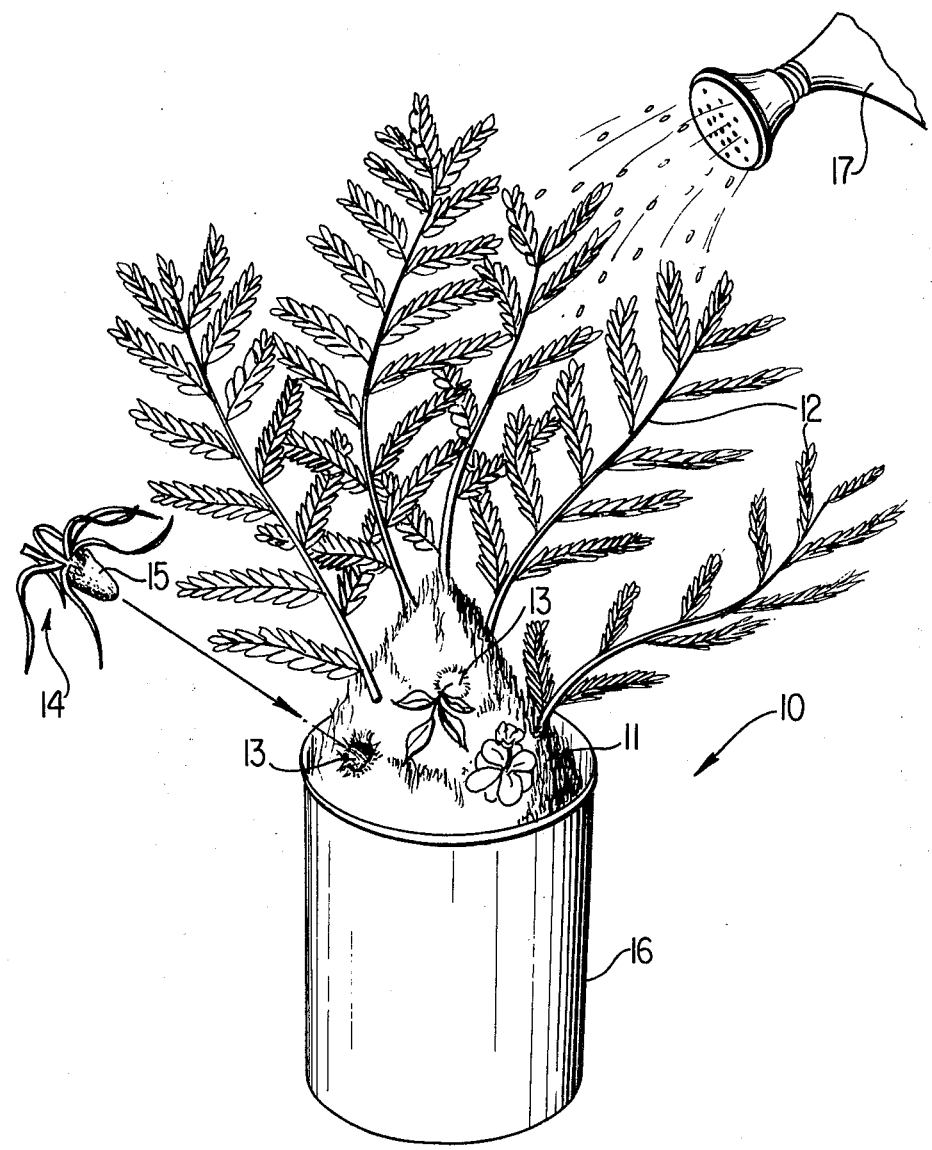

METHOD OF GROWING PLANTS IN THE ROOTS OF A LIVE OSMUNDA FERN

BACKGROUND OF THE INVENTION

1. Field of Invention

The invention relates to a planter comprised of a living plant having a large porous and fibrous root mass capable of absorbing and holding water, and at least one hole formed in the root of the living plant for receiving the roots of a diverse live plant. With multiple holes formed in the fibrous root of the living plant and with multiple diverse plants of different types potted in the multiple holes, the planter becomes a garden.

The invention further relates to a method for growing plants in the fibrous root mass of a living plant.

2. Background of the Invention

Certain plants and particularly the osmunda fern, have a large mounded, fibrous root mass which is porous and is capable of absorbing and retaining water.

It is well known that the dead root mass of the osmunda fern may be hollowed out and shaped to form a porous pot. Osmundine pots formed from the dead roots are advertised for sale in the Fall 1977 Catalog of Geo. W. Park Seed Co. Inc. Other porous or fibrous planters are disclosed by the following patents: 2,700,847; 2,848,842; 3,818,633; 3,958,365.

The planter of the present invention is distinguished from other planters known to me in that it comprises the fibrous root mass of a living plant.

SUMMARY OF THE INVENTION

It is an object of this invention to provide a planter for various plants which comprises a fibrous, mounded root mass of selected living plants, such as the root mass of an osmunda fern, and at least one hole formed in the fibrous root mass for receiving the roots of a diverse plant.

It is a further object of this invention to provide a planter for a garden of diverse plants wherein the fibrous root mass of the living plant according to this invention is provided with a plurality of spaced holes for receiving the roots of multiple diverse live plants.

It is still another object of this invention to provide a colorful garden wherein the diverse plants forming the garden are selected on the basis of the color of the blooms, foliage and fruit. Representative plants which may be planted in the planter of this invention are tomato plants, strawberry plants, orchid plants, bromeliad plants and violets, to name only a few plants which may be used.

It is still another object of this invention to provide a method for growing plants in the fibrous root mass of a living plant.

BRIEF DESCRIPTION OF THE DRAWING

With the foregoing more important objects and features in view and such other objects and features which may become apparent as this specification proceeds, the invention will be understood from the following description taken in conjunction with the accompanying drawing which shows a perspective view of a planter according to this invention.

BRIEF DESCRIPTION OF THE PREFERRED EMBODIMENT

Referring to the drawing, a planter according to this invention is generally indicated by the reference numeral 10. The planter 10 comprises the mounded, fibrous root mass 11 of a living osmunda fern having live fronds 12 extending upwardly from the root. One or more holes 13 are cut into the fibrous root mass 11, the holes each being of a size sufficient to receive the roots of a selected diverse plant 14. The roots of the selected diverse plant 14 are preferably wrapped in sphagnum moss 15 or other porous material prior to inserting the plant into one of the holes 13. The sphagnum moss serves to fill the hole 13 and helps to hold the roots of the plant 14 in the hole until its roots grow and intermesh with the fibers of the osmunda fern root mass 11. The root mass 11 of the osmunda fern is preferably potted within a container 16 made of metal, plastic or wood. The container 16 may be self supporting upon a flat surface or it may be suspended in the manner of a hanging basket. Peat or other humus material is used to fill the space between the root mass 11 and the walls of the container 16 encompassing the root. The peat is filled to within a short distance from the top of the container in the order of from one to two inches.

The method of this invention includes the basic steps of incising at least one hole 13 in the fibrous root mass 11 of a living plant, the root of which is mounded, porous and capable of absorbing water, and planting a selected diverse plant 14 in the hole 13 and periodically pouring water over the root 11 from a watering can 17 or other watering means.

An additional method step may include potting the root mass 11 of the living plant in a container 16. In potting the root mass 11, gravel is first placed in the bottom of the container for drainage in accordance with standard potting practice and filling the space between the root 11 and the side walls of the container to just below the top of the container with peat or other humus.

A further method step may include mixing soluble plant nutrients with the water from time to time as may be needed.

By incising multiple holes in the root mass 11 of the osmunda fern and selecting diverse plants on the basis of color of foliage, flower, and/or fruit, a beautiful tropical garden may be had. Various types of plants well adapted to growing in the osmunda fern root fibers are orchids, bromeliads, African violets, strawberries, tomatoes and others. the green fronds of the osmunda fern together with the various colored flowers and plants growing in the fibrous root system of the osmunda fern make an attractive ornamental display. Not only is the tropical garden a thing of beauty and art, it may also be a producer of food depending upon the gardener's selection of plants to be rooted in the fibrous root mass of the osmunda fern.

In potting the root mass of the osmunda fern in an open top container, the root mass is placed centrally within the container with a substantial portion of the root mass and the fern fronds extending above the open top of the container. The holes formed in the fibrous root mass for receiving diverse plants are preferably located in the portion of the root mass extending above the open top where the diverse plants will be clearly visible. After the diverse plants are implanted individually in the separate holes, they are preferably secured to the fibrous root mass of the osmunda fern by suitable fastening means such as staples. The staples or other fastening means hold the diverse plant secure in the hole until new root growth of the diverse plant has interlocked with the fibrous roots of the osmunda fern.

The osmunda fern should be watered once each day and given a chemical nutrient every thirty days. The diverse plants implanted in the fibrous root mass will receive their water and chemical nourishment by osmosis through the fibrous root system of the osmunda fern. No water or nourishment will have to be given to the diverse plants directly.

The root system of the osmunda fern and other living plants from which the planter of this invention is formed is a compact mass of intertwined fibers, bulbous or mounded in appearance. The compact mass of fibers forming the root system of the living plant is what is referred to as the porous, fibrous roots of the living plant throughout the specification and claims. While the osmunda fern is the preferred living plant from which the planter of this invention is formed, other living plants having root systems of similar characteristics to the root system of the osmunda fern may also be used.

The holes incised in the fibrous root mass of the living plant are cut to a depth and size which will depend upon the size of the diverse plant to be implanted. Wrapping the roots of the diverse plant before implantation with sphagnum moss or other porous material will ensure quick growth.

While in the foregoing there has been described and shown a preferred embodient of the invention, various modifications and equivalents may be resorted to within the spirit and scope of the invention as claimed.

What is claimed is:

1. A method for growing plants comprising forming at least one hole in the fibrous root mass of a living fern plant which is capable of absorbing and holding water and plant nutrients, planting a diverse live plant in said hole formed in said root mass and periodically pouring water onto the fibrous root mass of said living plant so that water is absorbed and held by the fibrous root mass and is available to supply water to the diverse live plant planted in said hole.

2. The method of claim 1 wherein said living fern plant is an osmunda fern.

3. The method of claim 1 together with the step of periodically adding soluble plant nutrients to the water poured onto the fibrous root mass.

4. The method according to claim 1 wherein said step of planting a diverse plant in said hole includes encompassing the roots of the diverse plant in a porous humus material, and inserting the roots of the diverse plant with encompassing humus material in said hole.

5. The method according to claim 4 wherein said planting step includes securing the diverse plant to said fibrous root mass with fastening means.

6. The method according to claim 1 wherein multiple holes are formed in said fibrous root mass of said living plant and a diverse plant is planted in each of said holes.

7. The method according to claim 1 which further includes potting said fibrous root of said living fern plant.

* * * * *